United States Patent
Shikayama et al.

(10) Patent No.: US 8,384,251 B2
(45) Date of Patent: Feb. 26, 2013

(54) LINEAR AND CURVILINEAR MOTOR SYSTEM

(75) Inventors: Toru Shikayama, Fukuoka (JP); Mikio Oshima, Fukuoka (JP); Kenichi Sadakane, Fukuoka (JP); Shogo Makino, Fukuoka (JP)

(73) Assignee: Kabushiki Kaisha Denki, Kitakyushu-Shi (JP)

( * ) Notice: Subject to any disclaimer, the term of this patent is extended or adjusted under 35 U.S.C. 154(b) by 345 days.

(21) Appl. No.: 12/854,171

(22) Filed: Aug. 11, 2010

(65) Prior Publication Data

US 2011/0043053 A1 Feb. 24, 2011

(30) Foreign Application Priority Data

Aug. 18, 2009 (JP) ................ P2009-189575
Jul. 2, 2010 (JP) ................ P2010-151646

(51) Int. Cl.
*H02K 41/03* (2006.01)

(52) U.S. Cl. ............... 310/12.15; 310/12.02; 310/12.09; 310/12.19; 310/12.31

(58) Field of Classification Search ............... 310/12.15, 310/12.01–12.33, 14, 15

See application file for complete search history.

(56) References Cited

U.S. PATENT DOCUMENTS

| 6,876,107 B2 * | 4/2005 | Jacobs | 310/12.19 |
| 7,154,198 B2 * | 12/2006 | Kawai | 310/12.15 |

FOREIGN PATENT DOCUMENTS

| JP | 11-196502 | 7/1999 |
| JP | 2001-251841 | 9/2001 |
| JP | 2003-070225 | 3/2003 |
| JP | 2006-174605 | 6/2006 |

* cited by examiner

*Primary Examiner* — Tran N. Nguyen
*Assistant Examiner* — Leda Pham
(74) *Attorney, Agent, or Firm* — Ditthavong Mori & Steiner, P.C.

(57) ABSTRACT

A linear and curvilinear motor system includes: linear and curvilinear guiding devices movably guiding and respectively supporting right and left of a slider, each having a guide rail configured by linear tracks and a circular arc track and slider blocks; a motor unit having a stator with a stator linear section and a stator circular arc section and a mover with a linear section and provided for the slider and away from the stator with a gap interposed therebetween; and an encoder head and a hole sensor detecting positions of the linear tracks and the circular arc track. When a magnetic pole pitch of the linear section of the stator is a distance $\lambda m$ and a magnetic pole pitch of the circular arc section of the stator is an angle $\gamma m$, a radius r of the circular arc track at the position detection point is defined as $r=\lambda m/\gamma m$.

17 Claims, 6 Drawing Sheets

LINEAR AND CURVILINEAR MOTOR SYSTEM

CROSS-REFERENCE TO RELATED APPLICATION

The present application claims priority under 35 U.S.C. §119 to Japanese Patent Applications No. 2009-189575 filed Aug. 18, 2009 and No. 2010-151646 filed Jul. 2, 2010. The contents of the application are incorporated herein by reference in their entirety.

The present invention relates to a linear and curvilinear motor system.

DESCRIPTION OF RELATED ART

As linear and curvilinear motor systems used as positioning devices for semiconductor manufacturing apparatuses and liquid crystal manufacturing apparatuses, for example, there is proposed a linear and curvilinear motor system in which a mover generates a thrust force with respect to a stator having a linear section and a circular arc section, thereby the mover travels along a linear and curvilinear guiding device having a guide rail configured by a linear track and a circular arc track, as described in Japanese Unexamined Patent Application Publication No. 2001-251841 published on Sep. 14, 2001, or in Japanese Unexamined Patent Application Publication No. 2006-174605 published on Jun. 29, 2006.

In such a linear and curvilinear motor system, the mover is configured only by a linear section, and configured as an armature by a coil. On the other hand, the stator is configured by a stator linear section and a stator circular arc section, each provided such that a plurality of permanent magnets are arranged within a yoke whose cross-section is a U shape such that magnetic poles of adjacent magnets are different. Thus, as the coil is disposed on a mover side, the configuration is a movable coil type.

In such a configuration, when a current flows through the coil, the mover generates a thrust force acting with a magnetic field formed by the permanent magnets. As the permanent magnets of the stator linear section are arranged along the linear track and the permanent magnets of the stator circular arc section are arranged along the circular arc track, the mover is able to generate the thrust force and travels in either direction of the track.

SUMMARY OF THE INVENTION

A first aspect of the present invention provides a linear and curvilinear motor system including:

a pair of right and left linear and curvilinear guiding devices that movably guide and respectively support right and left of a slider, each provided with a guide rail and slider blocks, the slider being disposed with and facing toward a fixed base, the guide rail being configured by linear tracks and a circular arc track;

a motor unit provided with a stator having both a linear section and a circular arc section and provided for the fixed base and a mover having a linear section and provided for the slider and away from the stator with a gap interposed therebetween, such that the slider is moved reciprocatingly along a length direction of the linear and curvilinear guiding devices with respect to the fixed base; and a position detecting device that detects positions of the linear tracks and the circular arc track, wherein when a magnetic pole pitch of the linear section of the stator is a distance $\lambda m$ and a magnetic pole pitch of the circular arc section of the stator is an angle $\gamma m$, a radius $r$ of the circular arc track at the position detection point is defined as:

$$r = \lambda m / \gamma m.$$

According to the present invention, as the position detecting device that detects the positions of the linear tracks and the circular arc track is provided between a pair of right and left linear and curvilinear guiding devices and the positions are detected at positions with the radius where the distance of the magnetic pole pitch of the linear tracks is identical with that of the circular arc track, the magnetic pole pitches of the linear tracks become the same as that of the circular arc track, and a position of a center of the mover and an amount of travel of the linear tracks become the same as those of the circular arc track. Thus, the present invention provides an advantageous effect of solving the problem of the conventional technique, and providing a linear and curvilinear motor system with which smooth traveling along a locus configured by linear tracks and a circular arc track as well as accurate positioning are realized.

BRIEF DESCRIPTION OF THE DRAWINGS

The present invention will be described in further detail with reference to the accompanying drawings wherein.

DETAILED DESCRIPTION OF THE EMBODIMENTS

The following describes embodiments of the present invention with reference to the drawings.

Embodiment 1

Figure 1:
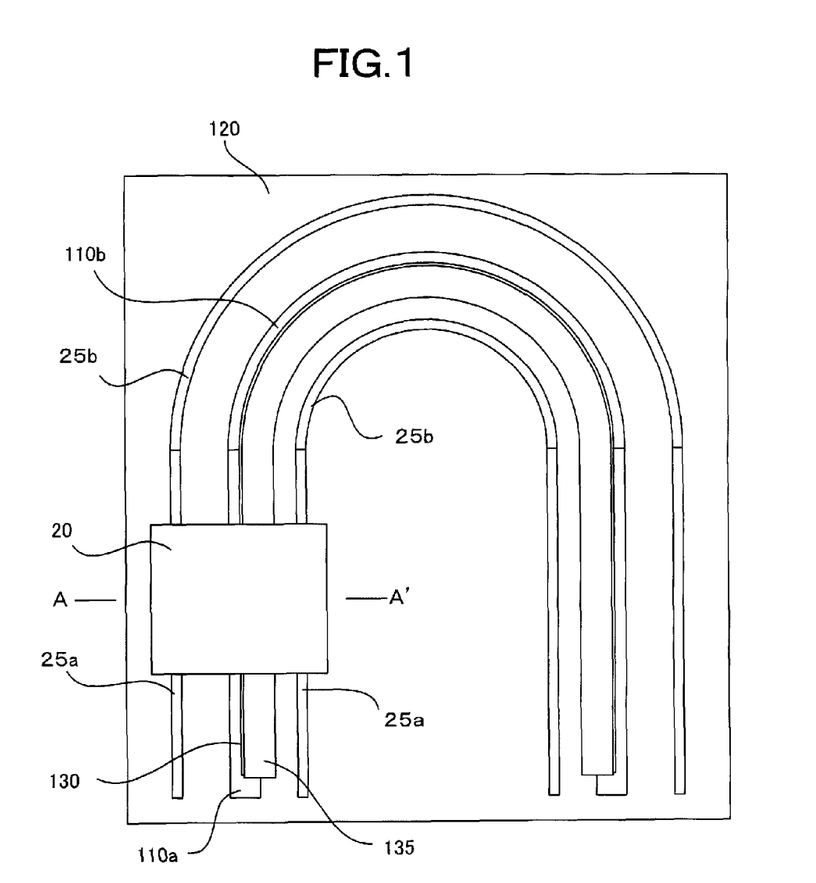
FIG. 1 is a top view illustrating an entire structure of a linear and curvilinear motor system that is common to embodiments.
Figure 2:
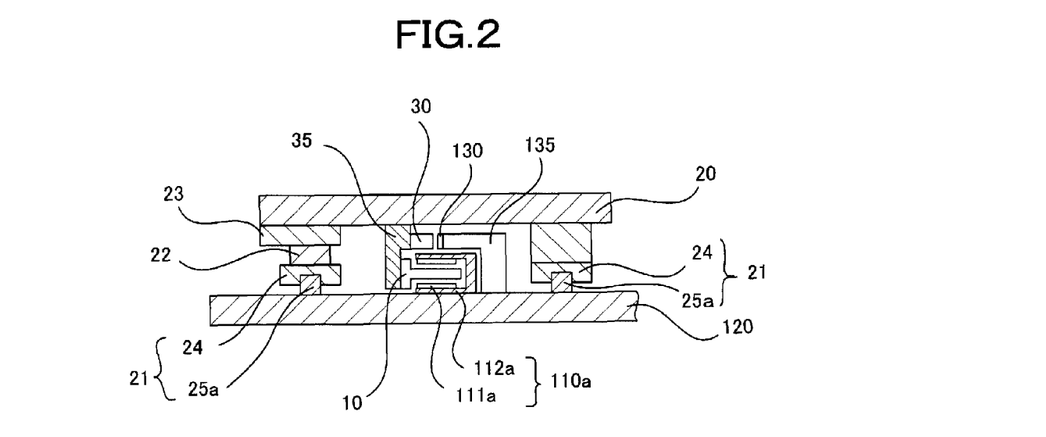
FIG. 2 is a frontal cross-sectional view taken along line A-A' in FIG. 1.
Figure 3A:
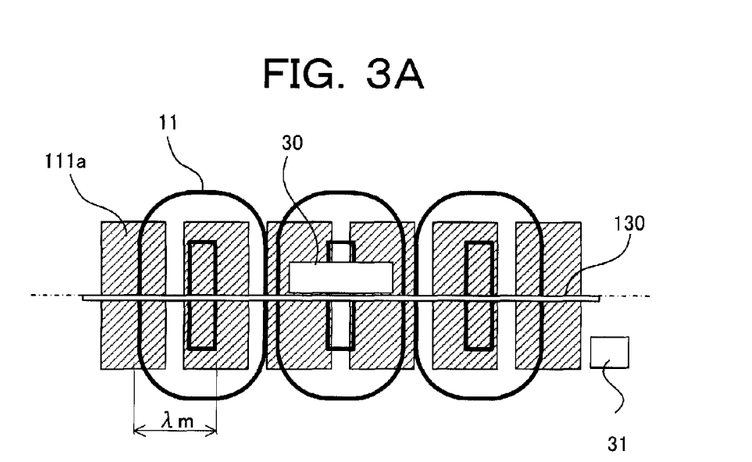
FIG. 3A shows an arrangement of coils, permanent magnets, a scale and encoder head, and a hole sensor that are common to the embodiments viewed from top, illustrating a state during linear track traveling.
Figure 3B:
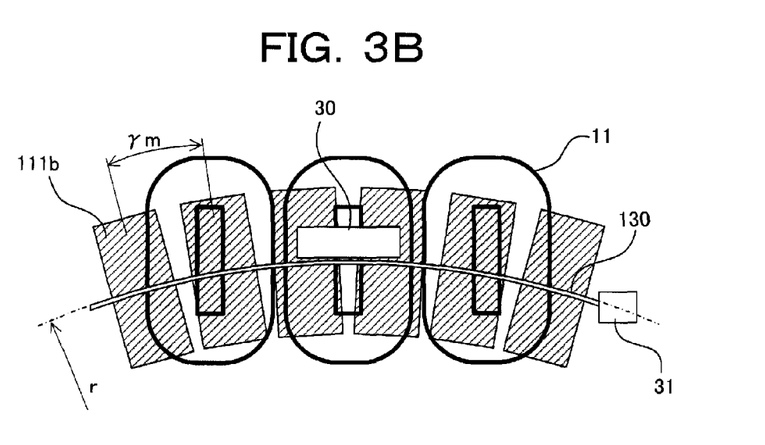
FIG. 3B shows an arrangement of the coils, the permanent magnets, the scale and encoder head, and the hole sensor that are common to the embodiments viewed from top, illustrating a state during circular arc track traveling.

FIG. 1 is a top view illustrating an entire structure of a linear and curvilinear motor system that is common to embodiments, and FIG. 2 is a cross-sectional view taken along line A-A' in FIG. 1. Further, FIG. 3A shows an arrangement of coils, permanent magnets, a scale and encoder head, and a hole sensor that are common to the embodiments viewed from top, illustrating a state during linear track traveling. FIG. 3B shows an arrangement of the coils, the permanent magnets, the scale and encoder head, and the hole sensor that are common to the embodiments viewed from top, illustrating a state during circular arc track traveling.

Figure 4A:
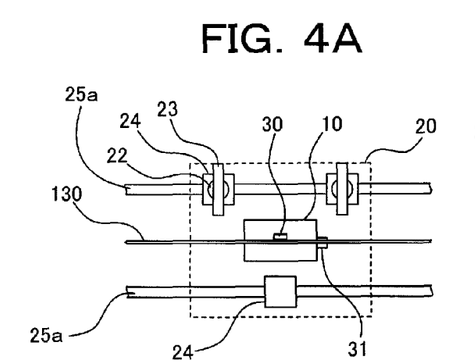
FIG. 4A is a perspective view of a slider of the linear and curvilinear motor system showing a structure of a first embodiment viewed from top, illustrating the state during linear track traveling.
Figure 4B:
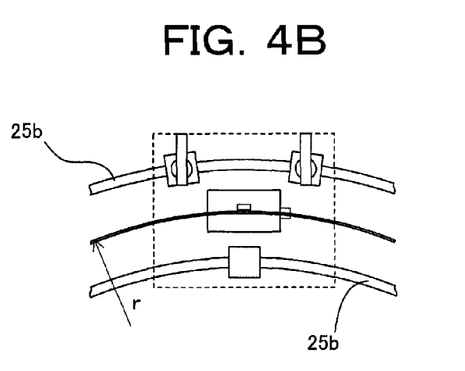
FIG. 4B is a perspective view of the slider of the linear and curvilinear motor system showing a structure of the first embodiment viewed from top, illustrating the state during circular arc track traveling.

Moreover, FIG. 4A is a perspective view of a slider of the linear and curvilinear motor system showing a structure of a first embodiment viewed from top, illustrating the state during linear track traveling. FIG. 4B is a perspective view of the slider of the linear and curvilinear motor system showing a structure of the first embodiment viewed from top, illustrating the state during circular arc track traveling.

The linear and curvilinear motor system shown in FIG. 1 has a locus in which a 180-degree circular arc track is connected between two parallel linear tracks. Here, the track shown in FIG. 1 is a half circle track.

In these figures, a reference number 120 represents a fixed base, a reference number 10 represents a mover, a reference number 11 represents a coil, a reference number 20 represents a slider disposed facing toward and in parallel with the fixed base 120, a reference number 21 represents a pair of right and left linear and curvilinear guiding devices that respectively guide and support both sides of the slider 20 in a movable manner, each of the linear and curvilinear guiding devices being configured by guide rails 25 each having linear tracks and a circular arc track and slider blocks 24, a reference number 22 represents a rotary guiding device, a reference number 23 represents a slide guiding device, a reference number 30 represents an encoder head, a reference number 31 represents a hole sensor, a reference number 35 represents a mover holder, a reference number 110a represents a stator linear section, a reference number 110b represents a stator circular arc section, a reference number 111a represents a permanent magnet of the stator linear section 110a, a reference number 111b represents a permanent magnet of the stator circular arc section 110b, a reference number 112a represents a yoke of the stator linear section 110a, a reference number 25a represents a rail linear section, a reference number 25b represents a rail circular arc section, a reference number 130 represents a scale, and a reference number 135 represents a scale holder.

A characteristic of this embodiment is in that an encoder and a hole sensor as a position detecting device that detects positions of the linear tracks and the circular arc track are provided between a pair of right and left linear and curvilinear guiding devices, and position detection points thereof are provided at positions with a radius with which distances of a magnetic pole pitch of the linear and curvilinear motor become identical between the linear tracks and the circular arc track.

Next, to describe the linear and curvilinear motor system concretely, a stator side is configured by the fixed base 120, the rail linear sections 25a as the linear tracks and the rail circular arc section 25b as a circular arc track that configure the guide rail 25 of each linear and curvilinear guiding device 21, the stator linear section 110a and the stator circular arc section 110b that configure a stator unit of a motor unit, and the scale 130 provided on the stator side of the position detector and holds position information of the linear tracks and the circular arc track and the scale holder 135, and other components are disposed on the fixed base 120.

Between the two rail linear sections 25a, the stator linear section 110a and the scale holder 135 are disposed, and, further, the scale 130 is attached to the scale holder 135 on the stator linear section 110a. Moreover, between the two rail circular arc sections 25b, the stator circular arc section 110b and the scale holder 135 that is formed in a circular arc are disposed, and the scale 130 is similarly attached to the scale holder 135 on the stator circular arc section 110b. Then, the rail linear section 25a and the rail circular arc section 25b, as well as the stator linear section 110a and the stator circular arc section 110b are disposed such that there is no joint line visible between the linear tracks and the circular arc track.

Further, the scale holder 135 and the scale 130 are integral and not divided between the linear tracks and the circular arc track. Furthermore, the stator linear section 110a and the stator circular arc section 110b of the motor unit have cross-sections in a U shape, and the plurality of permanent magnets 111a and 111b that are arranged within the yoke 112a and a yoke 112b respectively along a length direction are disposed such that two adjacent magnetic poles are different.

On the other hand, a mover side of the linear and curvilinear motor system is configured by the slider 20, the mover 10 of the motor unit, the encoder head 30 that detects the position information of the position detector, the hole sensor 31, and the mover holder 35 and other components are disposed on the slider 20. The mover holder 35 is attached to a substantial center of the slider 20, and the mover 10, the encoder head 30, and the hole sensor 31 are attached to the mover holder 35. Here, the mover 10 and the hole sensor 31 are inserted into a gap formed between the permanent magnets 111a and 111b of the stator linear section 110a and the stator circular arc section 110b, and the encoder head 30 is disposed at a position facing toward the scale 130 with a predetermined gap therebetween.

Further, as shown in FIG. 4A and FIG. 4B, the linear and curvilinear guiding devices 21 of K=3 are disposed at three positions of the slider 20 (two positions on the side of an external diameter and one position on the side of an internal diameter), and the rotary guiding devices 22 and the slide guiding devices 23 of K−1=2 are attached on the side of the external diameter. As the linear and curvilinear guiding devices 21, Straight-curved Guides Model HMG produced by THK Co., Ltd are used, for example. These linear and curvilinear guiding devices 21 support and guide the slider 20 movably in a direction of the linear tracks during linear track traveling, and support and guide the slider 20 movably in a direction of the circular arc track during circular arc track traveling. The slide guiding devices 23 are disposed under the slider 20 so as to be perpendicular to the rail linear section 25a, and support and guide the slider 20 movably along a direction perpendicular to the direction of the circular arc track (radial direction of the circular arc) during circular arc track traveling. The rotary guiding devices 22 are each disposed between the slide guiding device 23 and the linear and curvilinear guiding device 21, and support and guide the linear and curvilinear guiding devices 21 rotatably along the rail circular arc section 25b during circular arc track traveling.

By configuring in the above manner, the slider 20 is able to travel along the linear tracks during linear track traveling, and to travel along the circular arc track during circular arc track traveling. Here, the slider 20 during circular arc track traveling travels while being restrained in a radial direction by one of the linear and curvilinear guiding devices 21 that is on the internal diameter side. Thus, movement loci of a center of the mover 10, the encoder head 30, and the hole sensor 31 form circular arcs.

The mover 10 is configured by the plurality of coils 11 as armatures. A positional relation between the coils 11 and the permanent magnets 111a and 111b is as shown in FIG. 3A and FIG. 3B. The permanent magnets 111a face parallelly toward the coils 11 during linear track traveling, and the permanent magnets 111b face obliquely toward the coils 11 during circular arc track traveling. Further, during circular arc track traveling, the position detection point of the encoder as a surface of the scale 130 is positioned at a radius r. As described above, as the encoder head 30 and the hole sensor 31 mounted on the slider 20 show the movement loci in a circular arc, the encoder head 30 is disposed spaced from the radius r with a detectable gap therebetween, and the hole sensor 31 is positioned at the radius r. Further, when the distance of the magnetic pole pitch of the stator linear section 110a is λm, and an angle of the magnetic pole pitch of the stator circular arc section 110b is γm, it is set as follows.

$$r = \lambda m / \gamma m \qquad \text{Expression 1}$$

This represents that the distance λm of the magnetic pole pitch of the stator linear section 110a and a distance r×γm of the magnetic pole pitch of the stator circular arc section 110b are identical at the position of the radius r. By configuring in the above manner, it is possible to detect the positions of the encoder and the hole sensor at a radius at which the distances of the magnetic pole pitch of the linear tracks and the circular arc track are identical.

At this time, as the unit of the angle γm of the magnetic pole pitch of the stator circular arc section 110b is radian, calculating the radian in an actual angle θ (degrees), the position of the radius r of the hole sensor 31 is actually calculated using $r = 180 \times \lambda m / (\pi \theta)$.

Next, an operation of the linear and curvilinear motor system is described.

In the linear and curvilinear motor system, by conducting current to the coils 11 of the mover 10 based on the information of the magnetic pole obtained from the hole sensor 31, due to an action with the magnetic field generated by the permanent magnets 111a and 111b of the stator linear section 110a and the stator circular arc section 110b, the mover 10 generates a predetermined thrust force along the linear tracks and the circular arc track, and the slider 20 supported and guided by the linear and curvilinear guiding devices 21, the rotary guiding devices 22, and the slide guiding devices 23 travels along the guide rails 25 each configured by the rail linear sections 25a and the rail circular arc section 25b of the linear and curvilinear guiding devices 21.

Specifically, the slider 20 is able to move the encoder head 30 as the position detecting device along the radius r with which the distances of the magnetic pole pitch of the linear and curvilinear motor become identical between the linear section and the circular arc section, while the two slider blocks 24 each configured by combining the rotary guiding device 22 and the slide guiding device 23 of one of the guide rails that is on the side of the external diameter out of the three slider blocks 24 provided under the slider 20 restrain the single slider block 24 (for which the rotary guiding device 22 and the slide guiding device 23 are not provided) of the linear and curvilinear guiding device 21 provided for one of the guide rails that is on the side of the internal diameter in the radial direction. At this time, as a centrifugal force is generated on an external side of the slider 20 when the slider 20 travels along the circular arc track of the guide rail, the slide guiding device 23 moves the slider in the direction perpendicular to the rail linear sections 25a as the linear tracks of the guide rail and the rail circular arc section 25b as the circular arc track of the guide rail. Further, when the slider 20 travels along the circular arc track of the guide rail, according to the centrifugal force generated on the external side of the slider 20, the rotary guiding device 22 rotates the slider blocks 24 in the same direction as the circular arc direction of the rail circular arc section 25b.

Moreover, as the position of the mover 10 is controlled based on the information of the positions obtained from the encoder head 30, position control can be realized. Specifically, it is possible to realize smooth traveling as well as accurate positioning along an entire track configured by the linear tracks and the circular arc track.

As described above, providing both the hole sensor and the encoder for the position detector enables highly accurate current control and position control.

Therefore, the linear and curvilinear motor system according to the first embodiment is provided with a position detecting that detects positions of the linear tracks and the circular arc track between a pair of right and left linear and curvilinear guiding devices, and the positions are detected at the radius with which the distances of the magnetic pole pitch become identical between the linear tracks and the circular arc track. Accordingly, the magnetic pole pitches are identical between the linear tracks and the circular arc track, and the position of the center of the mover and an amount of travel of the linear tracks become identical with the circular arc track. Thus, when the mover generates a predetermined thrust force on the linear and curvilinear guiding devices each configured by the linear tracks and the circular arc track due to the action of the magnetic field generated by the permanent magnets of the stator linear section and the stator circular arc section, the thrust force and its speed do not change during linear track traveling and during circular arc track traveling, and the slider supported by the rotary guiding device and the slide guiding device provided between the slider blocks and the slider smoothly travels on the linear and curvilinear guiding devices, and the accurate positioning can be realized at the same time.

Embodiment 2

Figure 5A:
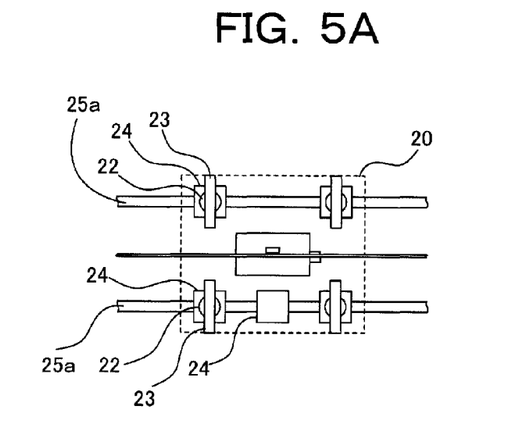
FIG. 5A is a perspective view of a slider of the linear and curvilinear motor system showing a structure of a second embodiment viewed from top, illustrating the state during linear track traveling.
Figure 5B:
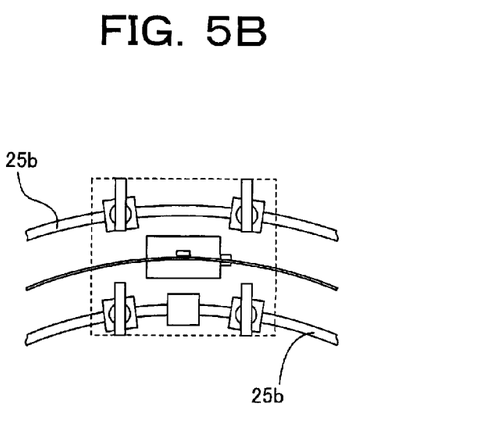
FIG. 5B is a perspective view of the slider of the linear and curvilinear motor system showing a structure of the second embodiment viewed from top, illustrating the state during circular arc track traveling.

FIG. 5A is a perspective view of the slider of the linear and curvilinear motor system showing a structure of a second embodiment viewed from top, illustrating the state during linear track traveling. FIG. 5B is a perspective view of the slider of the linear and curvilinear motor system showing a structure of the second embodiment viewed from top, illustrating the state during circular arc track traveling.

The second embodiment is different from the first embodiment in the numbers of the linear and curvilinear guiding devices 21, the rotary guiding devices 22, and the slide guiding devices 23.

Specifically, according to the second embodiment, a number K of the slider blocks of the linear and curvilinear guiding devices are provided under the slider (where K is an odd number no smaller than three). Between each of the (K−1) slider blocks and the slider, there are provided a slide guiding device having a mechanism of moving the slider in a direction perpendicular to the linear tracks or the circular arc track of the guide rail, and a rotary guiding device having a mechanism of rotating the corresponding slider block in the same direction as the direction of the circular arc track of the guide rail.

Specifically, in FIG. 5, a number K=5 of the slider blocks 24 of the linear and curvilinear guiding devices 21 are disposed at five positions under the slider 20 (two positions of the guide rail on the side of the external diameter and three positions of the guide rail on the side of the internal diameter), and the rotary guiding devices 22 of K−1=4 and the slide guiding devices 23 of K−1=4 are attached at four corners of each of the guide rails on the sides of the external diameter and the internal diameter.

As the linear and curvilinear motor system according to the second embodiment is configured as described above, in contrast to the configuration of the first embodiment in which the slider block 24 of the linear and curvilinear guiding device 21 for the guide rail on the side of the internal diameter is just one, the number of the slider blocks 24 changed to three, and two of the three slider blocks 24 provided for the guide rail on the side of the internal diameter are each combined with the rotary guiding device 22 and the slide guiding device 23. With this, while the two external and two internal slider blocks 24 out of the five slider blocks 24 provided under the slider 20, each combined with the rotary guiding device 22 and the slide guiding device 23 restrain the single slider block 24 (for which the rotary guiding device 22 and the slide guiding device 23 are not provided) of one of the linear and curvilinear guiding devices 21 provided for the guide rail on the side of the internal diameter in the radial direction, the slider 20 is able to make the encoder head 30 as the position detecting device movable along the radius r with which the distances of the magnetic pole pitch become identical between the linear section and the circular arc section. Thus, according to the second embodiment, it is possible to use a highly accurate encoder as the position detecting device, and it is possible to accurately position for an entire track configured by the linear tracks and the circular arc track.

As described above, according to the second embodiment, along with the first embodiment, the number of all of the slider blocks 24 of the linear and curvilinear guiding devices 21 is greater by one than the number of all of the slider blocks 24 each provided with the rotary guiding device 22 and the slide guiding device 23. In other words, when the number of the slider blocks 24 of the linear and curvilinear guiding devices 21 is K (K is an odd number no smaller than three), the number of the slider blocks 24 each provided with the rotary guiding device 22 and the slide guiding device 23 is defined as K−1. The number K of the linear and curvilinear guiding devices 21 can be set according to degrees of the loading and the centrifugal force.

Embodiment 3

Figure 6A:
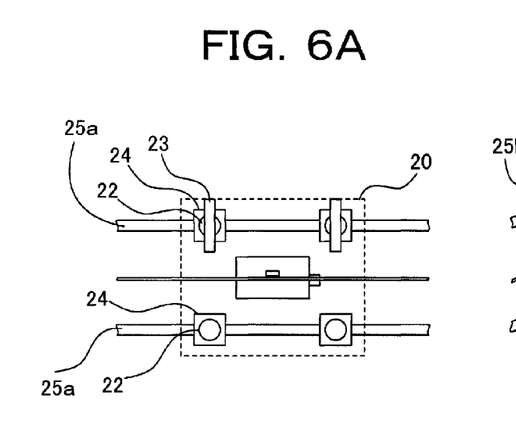
FIG. 6A is a perspective view of a slider of the linear and curvilinear motor system showing a structure of a third embodiment viewed from top, illustrating the state during linear track traveling.
Figure 6B:
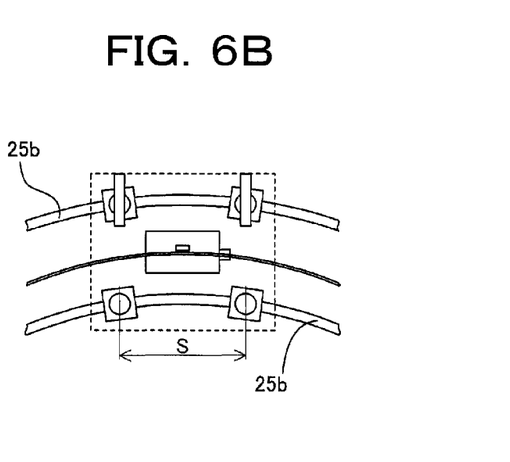
FIG. 6B is a perspective view of the slider of the linear and curvilinear motor system showing a structure of the third embodiment viewed from top, illustrating the state during circular arc track traveling.

FIG. 6A is a perspective view of the slider of the linear and curvilinear motor system showing a structure of a third embodiment viewed from top, illustrating the state during linear track traveling. FIG. 6B is a perspective view of the slider of the linear and curvilinear motor system showing a structure of the third embodiment viewed from top, illustrating the state during circular arc track traveling.

The third embodiment is different from the first embodiment and the second embodiment in the numbers of the linear and curvilinear guiding devices 21, the rotary guiding devices 22, and the slide guiding devices 23.

Here, the detecting devices 30, 31 are provided between a pair of right and left linear and curvilinear guiding devices 21.

Specifically, according to the third embodiment, a number K of the slider blocks 24 of the linear and curvilinear guiding devices 21 are provided on either of right and left sides under the slider 20 (K is an even number no smaller than two, and K=2 in this example). Between each of the slider blocks 24 and the slider 20, the first rotary guiding device 22 is provided for one of the guide rails 25 that are provided for the right and left of the slider 20, the first rotary guiding device 22 having a mechanism of rotating the corresponding slider block 24 in the same direction as a direction of the circular arc track of the guide rail, the slide guiding device 23 having a mechanism of moving the slider 20 in a direction perpendicular to the linear tracks or the circular arc track of the guide rail is provided for the other of the guide rails 25, and the second rotary guiding device 22 having a mechanism of rotating the corresponding slider block 24 in the same direction as the direction of the circular arc track of the guide rail is provided. The two linear and curvilinear guiding devices 21 and the two of rotary guiding devices 22 on the side of the internal diameter are respectively spaced apart by an interval S.

As the linear and curvilinear motor system according to the third embodiment is configured as described above, while the two slider blocks 24 positioned on the external one of the guide rails out of the four slider blocks 24 of the linear and curvilinear guiding devices 21 provided under the slider 20, each combined with the rotary guiding device 22 and the slide guiding device 23 restrain the two slider blocks 24 provided for the guide rail on the side of the internal diameter in the radial direction with each combined with only the rotary guiding device 22, the slider 20 is able to make the encoder head 30 as the position detecting device movable along the radius r with which the distances of the magnetic pole pitch become identical between the linear section and the circular arc section.

In this manner, according to the third embodiment, it is possible to travel along the linear tracks during linear track traveling, and it is possible to travel along the circular arc track during circular arc track traveling. While the restraint is realized by one of the linear and curvilinear guiding devices 21 in the radial direction in the first embodiment and the second embodiment, the restraint is realized by the two linear and curvilinear guiding devices 21 that are spaced apart by the interval S in the third embodiment. Therefore, the radius of the circular arc of the movement locus of the slider 20 becomes smaller than that in the first embodiment and the second embodiment. The scale 130, the encoder head 30, and the hole sensor 31 are disposed considering this.

With such a configuration, according to the third embodiment, it is possible to realize the same operation as in the first embodiment and the second embodiment, and the same effect can be provided. However, in comparison with the first embodiment and the second embodiment, it is possible, according to this embodiment, to increase the number of the linear and curvilinear guiding devices 21 on the side of the internal diameter in order to address such a situation in which the loading is large or in which the centrifugal force during circular arc track traveling is large, which is highly effective.

Here, the number of the slide guiding devices 23 is smaller by two than the numbers of the linear and curvilinear guiding devices 21 and the rotary guiding devices 22. In other words, when the number of the slider blocks 24 respectively provided with the rotary guiding devices 22 is K, the number of the slider blocks 24 each provided with both of the rotary guiding device 22 and the slide guiding device 23 can be defined as K−2. Thus, the number K of the slider blocks 24 of the linear and curvilinear guiding devices 21 can be set according to degrees of the loading and the centrifugal force.

Embodiment 4

Figure 7A:
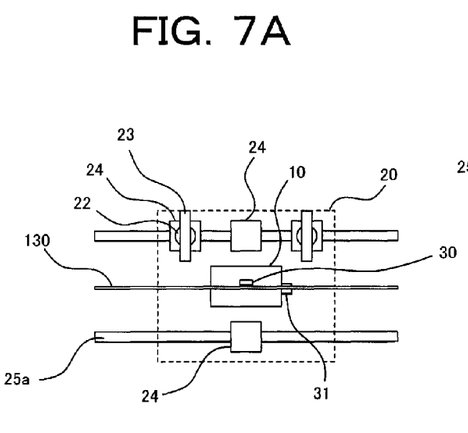
FIG. 7A is a perspective view of a slider of the linear and curvilinear motor system showing a structure of a fourth embodiment viewed from top, illustrating the state during linear track traveling.
Figure 7B:
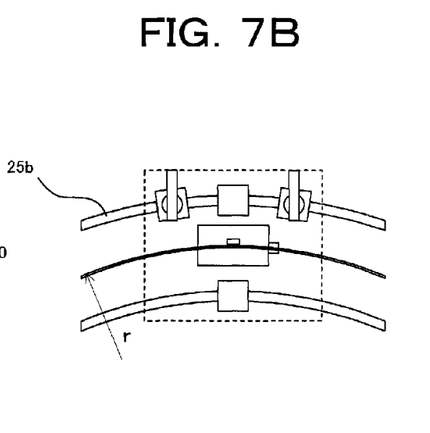
FIG. 7B is a perspective view of the slider of the linear and curvilinear motor system showing a structure of the fourth embodiment viewed from top, illustrating the state during circular arc track traveling.

FIG. 7A is a perspective view of the slider of the linear and curvilinear motor system showing a structure of a fourth embodiment viewed from top, illustrating the state during linear track traveling. FIG. 7B is a perspective view of the slider of the linear and curvilinear motor system showing a structure of the fourth embodiment viewed from top, illustrating the state during circular arc track traveling.

Referring to FIG. 7A and FIG. 7B, the fourth embodiment is different from the first to the third embodiments in that a number K of the slider blocks 24 of the linear and curvilinear guiding devices are provided under the slider 20 (where K is an integer number no smaller than 4, and total four positions are shown in the figure, including three positions on the side of the external diameter and one position on the side of the internal diameter), that the slide guiding device 23 and the rotary guiding device 22 are provided between each of the slider blocks 24 and the slider 20, the slide guiding device 23 being provided for each of two of the slider blocks 24 of one of the guide rails 25a that are provided on the right and left of the slider 20 and having a mechanism of moving the slider 20 along the direction perpendicular to the linear tracks or the circular arc track of the guide rail 25a, and the rotary guiding device 22 having a mechanism of rotating the corresponding slider block 24 in the same direction as the direction of the circular arc track of the guide rail 25a, and that the position detecting device 30, 31 is provided between a pair of right and left linear and curvilinear guiding devices 21.

In such a configuration, the slider blocks 24 of the linear and curvilinear guiding devices support and guide the slider 20 movably in the direction of the linear tracks during linear track traveling, and support and guide the slider 20 movably in the direction of the circular arc track during circular arc track traveling. The slide guiding devices 23 are disposed under the slider 20 so as to be perpendicular to the rail linear section 25a, and support and guide the slider 20 movably along a direction perpendicular to the direction of the circular arc track (radial direction of the circular arc) during circular arc track traveling. The rotary guiding devices 22 are each disposed between the slide guiding device 23 and the slider block 24, and support and guide the slider blocks 24 rotatably along the rail circular arc section 25b during circular arc track traveling. By configuring in the above manner, the slider 20 is able to travel along the linear tracks during linear track traveling, and to travel along the circular arc track during circular arc track traveling.

Here, the slider 20 during circular arc track traveling travels while being restrained in a radial direction by the two slider blocks 24 that are provided on the right and left thereof. Thus, movement loci of a center of the mover 10, the encoder head 30, and the hole sensor 31 form circular arcs. Further, even if there is a jolt in the linear and curvilinear guiding devices, such a jolt is canceled by the two slider blocks 24 on the right and left of the slider 20. As a result, variation of the slider 20 in a direction other than the directions along the linear tracks and the circular arc track is eliminated, and therefore variation of the encoder head 30 and the hole sensor 31 attached to the slider 20 is eliminated as well.

Further, as the slider blocks 24 of the two linear and curvilinear guiding devices are provided between a pair of right and left linear and curvilinear guiding devices 21, along a line that is perpendicular to the linear tracks or the circular arc tracks, and as the position detecting device 50 is provided between the two slider blocks 24, variation of the encoder head 30 and the hole sensor 31 due to the jolt of the linear and curvilinear guiding devices is eliminated. As these advantageous effects are added, it is possible to realize smooth traveling as well as accurate positioning along the track configured by the linear tracks and the circular arc track.

Embodiment 5

Figure 8A:
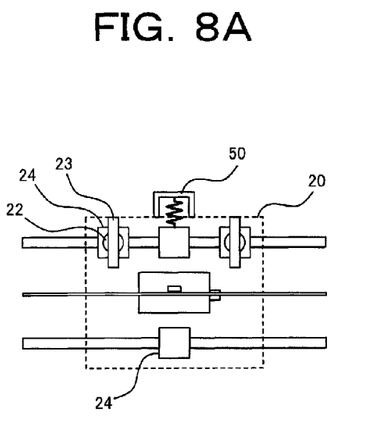
FIG. 8A is a perspective view of a slider of the linear and curvilinear motor system showing a structure of a fifth embodiment viewed from top, illustrating the state during linear track traveling.
Figure 8B:
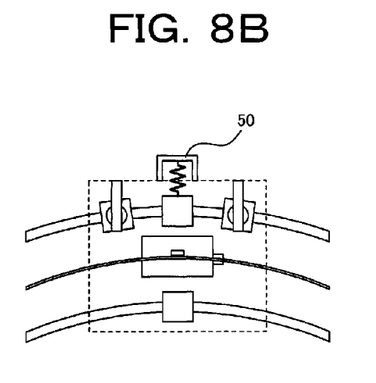
FIG. 8B is a perspective view of the slider of the linear and curvilinear motor system showing a structure of the fifth embodiment viewed from top, illustrating the state during circular arc track traveling.

FIG. 8A is a perspective view of the slider of the linear and curvilinear motor system showing a structure of a fifth embodiment viewed from top, illustrating the state during linear track traveling. FIG. 8B is a perspective view of the slider of the linear and curvilinear motor system showing a structure of the fifth embodiment viewed from top, illustrating the state during circular arc track traveling.

In FIG. 8, a reference number 50 represents a precompression adjusting device.

The fifth embodiment is different from the fourth embodiment in that the precompression adjusting device 50 is provided for the linear and curvilinear guiding devices. According to the fifth embodiment, the precompression adjusting device 50 is provided for one of the two slider blocks 24 provided on the right and left of the slider 20, the one being positioned on the external side during circular arc track traveling. The precompression adjusting device 50 is configured such that a spring is provided so as to press the slider block 24 against the rail linear section 25a or the rail circular arc section 25b.

With such a configuration, it is possible to carry out the same operation as that of the fourth embodiment, and obtain the same effects. Further, as the precompression adjusting device 50 is provided for the slider block 24, it is possible to adjust a jolt and a frictional resistance of the linear and curvilinear guiding devices by precompression. In other words, it is possible to realize smooth traveling as well as accurate positioning along an entire track configured by the linear tracks and the circular arc track.

Embodiment 6

Figure 9A:
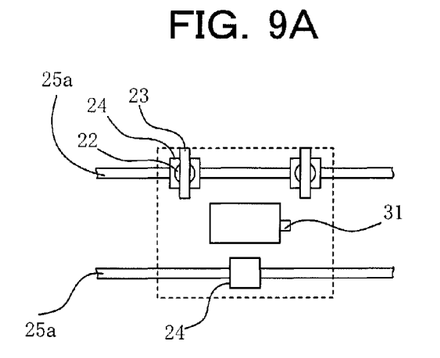
FIG. 9A is a perspective view of a slider of the linear and curvilinear motor system showing a structure of a sixth embodiment viewed from top, illustrating the state during linear track traveling.
Figure 9B:
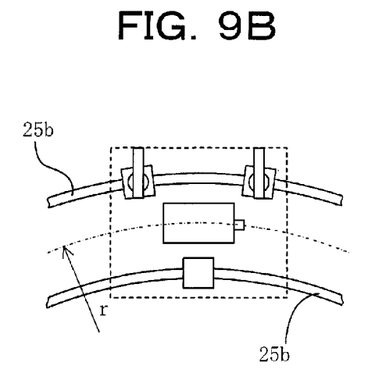
FIG. 9B is a perspective view of the slider of the linear and curvilinear motor system showing a structure of the sixth embodiment viewed from top, illustrating the state during circular arc track traveling.

FIG. 9A is a perspective view of the slider of the linear and curvilinear motor system showing a structure of a sixth embodiment viewed from top, illustrating the state during linear track traveling. FIG. 9B is a perspective view of the slider of the linear and curvilinear motor system showing a structure of the sixth embodiment viewed from top, illustrating the state during circular arc track traveling.

The sixth embodiment is different from the first to the fifth embodiments in that the position detecting device is configured only by the hole sensor 31. The information of the magnetic pole obtained from the hole sensor 31 is information with no error between the linear tracks and the circular arc track, as shown in the first embodiment. Thus, by conducting the current to the coils 11 of the mover 10 based on the information of the magnetic pole obtained from the hole sensor 31, the mover 10 can generate the predetermined thrust force on the linear tracks and the circular arc track due to the action of the magnetic field generated by the permanent magnets 111a and 111b of the stator linear section 110a and the stator circular arc section 110b. Specifically, it is possible to realize smooth traveling along an entire track configured by the linear tracks and the circular arc track.

Further, it is possible to generate a sine wave signal of the position by detecting a sine wave distribution of magnetic flux density of the permanent magnets 111a and 111b using the hole sensor 31, thereby carrying out the position control. Thus, in the field of application in which highly accurate positioning is not required, it is possible to carry out the positioning along an entire track configured by the linear tracks and the circular arc track with an inexpensive configuration without using an expensive encoder.

Embodiment 7

Figure 10A:
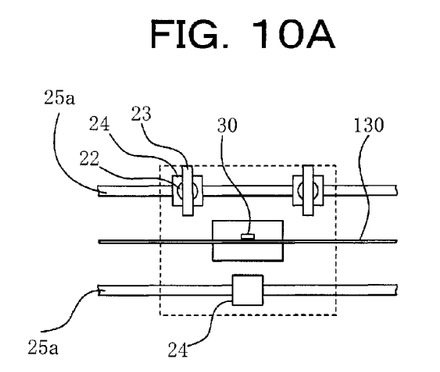
FIG. 10A is a perspective view of a slider of the linear and curvilinear motor system showing a structure of a seventh embodiment viewed from top, illustrating the state during linear track traveling.
Figure 10B:
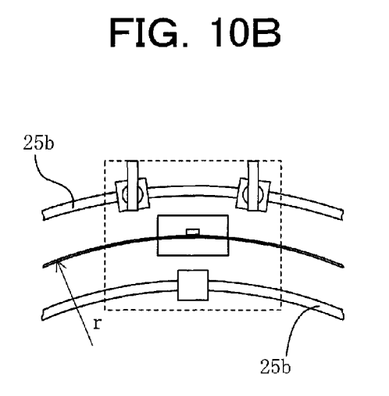
FIG. 10B is a perspective view of the slider of the linear and curvilinear motor system showing a structure of the seventh embodiment viewed from top, illustrating the state during circular arc track traveling.

FIG. 10A is a perspective view of the slider of the linear and curvilinear motor system showing a structure of a seventh embodiment viewed from top, illustrating the state during linear track traveling. FIG. 10B is a perspective view of the slider of the linear and curvilinear motor system showing a structure of the seventh embodiment viewed from top, illustrating the state during circular arc track traveling.

The seventh embodiment is different from the first to the sixth embodiments in that the position detecting device is configured only by an encoder provided with the scale 130 and the encoder head 30.

As the position detecting device is configured by a highly accurate encoder, it is possible to obtain a highly accurate position of the mover 10. It is possible to generate an electrical position of the mover 10 based on this information of the position, thereby carrying out the current control and the position control. Thus, it is possible to realize smooth traveling along a track configured by the linear tracks and the circular arc track, as well as accurate positioning.

Embodiment 8

Figure 11:
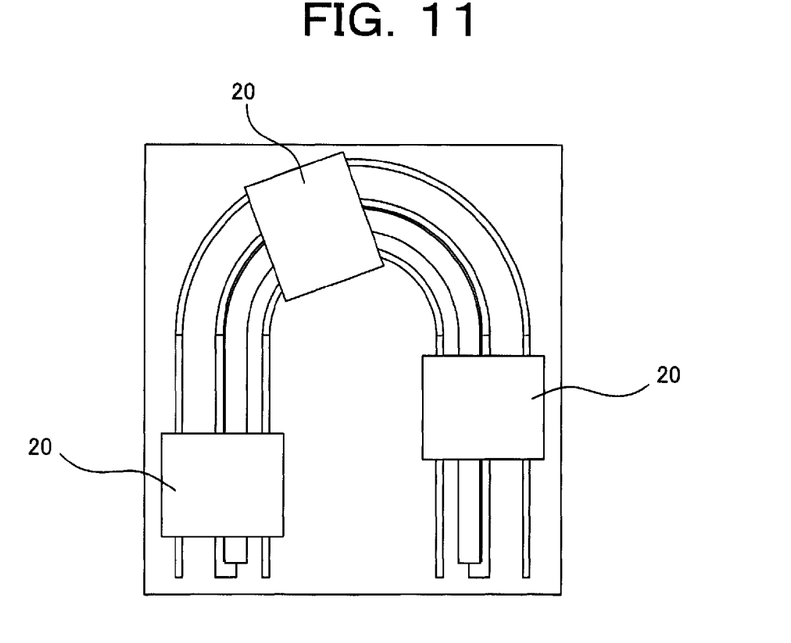
FIG. 11 is a top view of the linear and curvilinear motor system illustrating a structure of an eighth embodiment.

FIG. 11 is a top view of the linear and curvilinear motor system according to an eighth embodiment.

The eighth embodiment is different from the first to the seventh embodiments in that, a plurality of sliders 20 are provided, and the plurality of sliders 20 are individually moved. FIG. 11 shows an example in which three sliders 20 are provided.

As the plurality of sliders 20 are individually traveled and positioned, it is possible to realize a parallel operation using a plurality of sliders, and a cooperative operation between the sliders.

Embodiment 9

Figure 12:
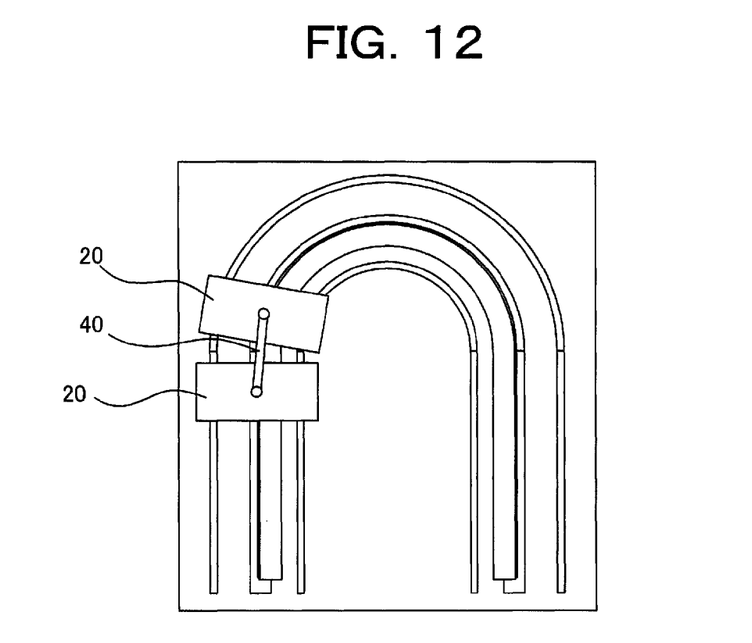
FIG. 12 is a top view of the linear and curvilinear motor system illustrating a structure of a ninth embodiment.

FIG. 12 is a top view of the linear and curvilinear motor system according to a ninth embodiment. In FIG. 12, a reference number 40 represents a coupling member.

The ninth embodiment is different from the first to the eighth embodiments in that, the plurality of sliders 20 are provided, and these sliders are rotatably coupled by the coupling member 40 so that the sliders are integrally traveled. FIG. 12 shows an example in which two sliders 20 are coupled.

As the plurality of sliders 20 are coupled and integrally moved, it is possible to transfer a large load or a plurality of loads at the same time.

Although the mover is configured as an armature by a coil, and the stator is configured by the permanent magnets as a field in the first to the ninth embodiments, it is appreciated that the present invention can be realized even if the configuration is inversed. Further, although the mover is configured as a coreless type only by a coil, it is appreciated that the present invention can be realized using the mover having a core.

Moreover, it is appreciated that the present invention can be realized employing a configuration in which the mover is configured as an armature by a coil and a core and the stator is configured as an inductor by core teeth, or a configuration in which permanent magnets are provided on a surface of and within the core.

Moreover, while a track is configured such that a 180-degree circular arc track is coupled between the two parallel linear tracks, the circular arc track can have any angle such as 60 degrees or 90 degrees, other than 180 degrees, and the track can be configured by such tracks.

What is claimed is:

1. A linear and curvilinear motor system, comprising:
a pair of right and left linear and curvilinear guiding devices that movably guide and respectively support right and left of a slider, each provided with a guide rail and slider blocks, the slider being disposed with and facing toward a fixed base, the guide rail being configured by linear tracks and a circular arc track, the guide rail provided on a surface of the fixed base, the slider blocks being connected to the slider and configured to slide along an uppermost surface of the guide rail;
a motor unit provided with a stator having both a linear section and a circular arc section and provided for the fixed base and a mover having a linear section and provided for the slider and away from the stator with a gap interposed therebetween, such that the slider is moved reciprocatingly along a length direction of the linear and curvilinear guiding devices with respect to the fixed base; and
a position detecting device that detects positions of the linear tracks and the circular arc track, wherein
when a magnetic pole pitch of the linear section of the stator is a distance $\lambda m$ and a magnetic pole pitch of the circular arc section of the stator is an angle $\gamma m$, a radius r of the circular arc track at a position detection point is defined as:

$r = \lambda m / \gamma m.$

2. The linear and curvilinear motor system according to claim 1, wherein
the position detecting device is between a pair of right and left linear and curvilinear guiding devices.

3. A linear and curvilinear motor system comprising:
a pair of right and left linear and curvilinear guiding devices that movably guide and respectively support right and left of a slider, each provided with a guide rail and slider blocks, the slider being disposed with and facing toward a fixed base, the guide rail being configured by linear tracks and a circular arc track;
a motor unit provided with a stator having both a linear section and a circular arc section and provided for the fixed base and a mover having a linear section and provided for the slider and away from the stator with a gap interposed therebetween, such that the slider is moved reciprocatingly along a length direction of the linear and curvilinear guiding devices with respect to the fixed base; and
a position detecting device that detects positions of the linear tracks and the circular arc track, wherein
when a magnetic pole pitch of the linear section of the stator is a distance $\lambda m$ and a magnetic pole pitch of the circular arc section of the stator is an angle $\gamma m$, a radius r of the circular arc track at a position detection point is defined as:

$r=\lambda m/\gamma m$, and wherein a number K of the slider blocks of the linear and curvilinear guiding devices are provided under the slider, where K is an odd number no smaller than three, and
between each of (K−1) of the slider blocks and the slider, a slide guiding device having a mechanism of moving the slider along a direction perpendicular to the linear tracks or the circular arc track of each guide rail and a rotary guiding device having a mechanism of rotating the slider block in the same direction as a direction of the circular arc track of each guide rail are provided.

4. A linear and curvilinear motor system comprising:
a pair of right and left linear and curvilinear guiding devices that movably guide and respectively support right and left of a slider, each provided with a guide rail and slider blocks, the slider being disposed with and facing toward a fixed base, the guide rail being configured by linear tracks and a circular arc track;
a motor unit provided with a stator having both a linear section and a circular arc section and provided for the fixed base and a mover having a linear section and provided for the slider and away from the stator with a gap interposed therebetween, such that the slider is moved reciprocatingly along a length direction of the linear and curvilinear guiding devices with respect to the fixed base; and
a position detecting device that detects positions of the linear tracks and the circular arc track, wherein
when a magnetic pole pitch of the linear section of the stator is a distance $\lambda m$ and a magnetic pole pitch of the circular arc section of the stator is an angle $\gamma m$, a radius r of the circular arc track at a position detection point is defined as:

$r=\lambda m/\gamma m$, and wherein the slider blocks of a number K of the linear and curvilinear guiding devices are provided under each of the right and left of the slider, where K is an even number no smaller than two, and
between each of the slider blocks and the slider, a first rotary guiding device is provided for one of the guide rails provided for the right and left of the slider, the first rotary guiding device having a mechanism of rotating the slider block in the same direction as a direction of the circular arc track of each guide rail, a slide guiding device having a mechanism of moving the slider along a direction perpendicular to the linear tracks or the circular arc track of each guide rail is provided for the other of the guide rails provided for the right and left, and a second rotary guiding device having a mechanism of rotating the slider block in the same direction as the direction of the circular arc track of each guide rail is provided.

5. A linear and curvilinear motor system comprising:
a pair of right and left linear and curvilinear guiding devices that movably guide and respectively support right and left of a slider, each provided with a guide rail and slider blocks, the slider being disposed with and facing toward a fixed base, the guide rail being configured by linear tracks and a circular arc track;
a motor unit provided with a stator having both a linear section and a circular arc section and provided for the fixed base and a mover having a linear section and provided for the slider and away from the stator with a gap interposed therebetween, such that the slider is moved reciprocatingly along a length direction of the linear and curvilinear guiding devices with respect to the fixed base; and
a position detecting device that detects positions of the linear tracks and the circular arc track, wherein
when a magnetic pole pitch of the linear section of the stator is a distance $\lambda m$ and a magnetic pole pitch of the circular arc section of the stator is an angle $\gamma m$, a radius r of the circular arc track at a position detection point is defined as:

$r=\lambda m/\gamma m$, and wherein a number K of the slider blocks of the linear and curvilinear guiding devices are provided under the slider, where K is an integer number no smaller than four,
between each of the slider blocks and the slider, a slide guiding device provided for each of two of the slider blocks of one of the guide rails that are provided on the right and left of the slider, the slide guiding device having a mechanism of moving the slider along a direction perpendicular to the linear tracks or the circular arc track of each guide rail, and a rotary guiding slider block in the same direction as a direction of the circular arc track of each guide rail are provided.

6. The linear and curvilinear motor system according to claim 5, wherein
one of the slider blocks is provided with a precompression adjusting device.

7. The linear and curvilinear motor system according to claim 1, wherein
the motor unit is configured such that one of the mover and the stator is configured as a field in which a plurality of permanent magnets are disposed at an equal pitch along a length direction of a planar magnetic yoke such that polarities of the magnets are alternately different, and the other of the mover and the stator is configured as an armature in which a plurality of armature coils are disposed.

8. The linear and curvilinear motor system according to claim 1 or 2, wherein
the position detecting device is configured by a hole sensor that detects a magnetic field of the permanent magnets.

9. The linear and curvilinear motor system according to claim 1 or 2, wherein
the position detecting device is configured by an encoder including a scale that holds position information of the linear tracks and the circular arc track and an encoder head that detects the position information.

10. The linear and curvilinear motor system according to claim 1, wherein
a plurality of sliders are provided, and the plurality of sliders are individually moved.

11. The linear and curvilinear motor system according to claim 10, wherein
the plurality of sliders are coupled and integrally moved.

12. The linear and curvilinear motor system according to claim 1, wherein at least one first slider block of the slider blocks is connected to the slider by a rotary guiding device that is configured to allow the at least one first slider block to pivot about a vertical axis with respect to the slider.

13. The linear and curvilinear motor system according to claim 12, wherein at least one second slider block of the slider blocks is fixedly connected to the slider to prevent the at least one second slider block from pivoting about the vertical axis with respect to the slider.

14. The linear and curvilinear motor system according to claim 1, wherein at least one slider block of the slider blocks is fixedly connected to the slider to prevent the at least one slider block from pivoting about a vertical axis with respect to the slider.

15. The linear and curvilinear motor system according to claim 1, wherein at least one slider block of the slider blocks is connected to the slider by a slide guiding device that is configured to allow the at least one slider block to move with respect to the slider in a direction extending between the right and left of the slider.

16. The linear and curvilinear motor system according to claim 12, wherein the at least one first slider block and the rotary guiding device are connected to the slider by a slide guiding device that is configured to allow the at least one first slider block and the rotary guiding device to move with respect to the slider in a direction extending between the right and left of the slider.

17. The linear and curvilinear motor system according to claim 13, wherein the at least one first slider block and the rotary guiding device are connected to the slider by a slide guiding device that is configured to allow the at least one first slider block and the rotary guiding device to move with respect to the slider in a direction extending between the right and left of the slider.

* * * * *

UNITED STATES PATENT AND TRADEMARK OFFICE
CERTIFICATE OF CORRECTION

| | |
|---|---|
| PATENT NO. | : 8,384,251 B2 |
| APPLICATION NO. | : 12/854171 |
| DATED | : February 26, 2013 |
| INVENTOR(S) | : Toru Shikayama et al. |

It is certified that error appears in the above-identified patent and that said Letters Patent is hereby corrected as shown below:

On the Title page, ITEM (73) should read as follows:

(73) Assignee: Kabushiki Kaisha Yaskawa Denki,
Kitakyushu-Shi (JP)

Signed and Sealed this
Twenty-fifth Day of June, 2013

Teresa Stanek Rea
*Acting Director of the United States Patent and Trademark Office*